United States Patent
Tanahashi et al.

(10) Patent No.: US 10,718,299 B2
(45) Date of Patent: Jul. 21, 2020

(54) INTAKE SYSTEM OF VEHICLE

(71) Applicant: TOYOTA JIDOSHA KABUSHIKI KAISHA, Toyota-shi, Aichi-ken (JP)

(72) Inventors: Toshio Tanahashi, Susono (JP); Yoji Kanehara, Nagoya (JP); Koshi Yamada, Odawara (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 492 days.

(21) Appl. No.: 14/979,664

(22) Filed: Dec. 28, 2015

(65) Prior Publication Data

US 2016/0186703 A1   Jun. 30, 2016

(30) Foreign Application Priority Data

Dec. 25, 2014 (JP) .................. 2014-263679

(51) Int. Cl.
*F02M 35/10* (2006.01)
*B01D 46/42* (2006.01)
(Continued)

(52) U.S. Cl.
CPC ......... *F02M 35/10* (2013.01); *B01D 46/0002* (2013.01); *B01D 46/4209* (2013.01);
(Continued)

(58) Field of Classification Search
CPC ................ B01D 46/4209; B01D 46/50; B01D 46/0002; F02M 35/0217; F02M 35/0205;
(Continued)

(56) References Cited

U.S. PATENT DOCUMENTS 2,925,874 A   2/1960   Norrie
3,597,668 A   8/1971   Yoshimine
(Continued)

FOREIGN PATENT DOCUMENTS

CN   101500686 A   8/2009
CN   203255258 U   10/2013
(Continued)

OTHER PUBLICATIONS

U.S. Patent and Trademark Office, Corrected Notice of Allowability dated Dec. 14, 2017 in U.S. Appl. No. 15/018,085, 4 pages.
(Continued)

*Primary Examiner* — Lindsay M Low
*Assistant Examiner* — Ruben Picon-Feliciano
(74) *Attorney, Agent, or Firm* — Hunton Andrews Kurth LLP

(57) ABSTRACT

An intake system of a vehicle, includes an air cleaner case, an air filter that is arranged inside the air cleaner case and positively charged, and a self discharge type static eliminator that decreases an amount of electrification charge on a wall surface of the air cleaner case within a limited range about a location where the self discharge type static eliminator is installed, when the self discharge type static eliminator is installed on the wall surface of the air cleaner case. An peripheral edge part of the air filter is held by an air filter holding part of the air cleaner case. The self discharge type static eliminator is installed on an outer wall surface of the air filter holding part of the air cleaner case.

7 Claims, 8 Drawing Sheets

(51) Int. Cl.
  *B01D 46/00* (2006.01)
  *F02M 35/02* (2006.01)
  *F02M 35/024* (2006.01)

(52) U.S. Cl.
  CPC ...... *F02M 35/024* (2013.01); *F02M 35/0205* (2013.01); *F02M 35/10321* (2013.01); *F02M 35/10327* (2013.01)

(58) Field of Classification Search
  CPC ................ F02M 35/024; F02M 35/10; F02M 35/10321; F02M 35/10327; H01T 19/00; H05F 3/04; H05F 3/06
  See application file for complete search history.

(56) References Cited

U.S. PATENT DOCUMENTS

| | | | |
|---|---|---|---|
| 3,922,214 A | 11/1975 | Van Cakenberghe | |
| 4,210,016 A | 7/1980 | Peter et al. | |
| 4,795,935 A | 1/1989 | Fujii et al. | |
| 5,095,400 A * | 3/1992 | Saito | H05F 3/04 361/212 |
| 5,212,451 A | 5/1993 | Werner, Jr. | |
| 5,303,584 A * | 4/1994 | Ogasawara | G01F 5/00 73/114.34 |
| 5,382,359 A | 1/1995 | Brandt | |
| 5,825,605 A | 10/1998 | Sutherland | |
| 6,235,385 B1 | 5/2001 | Lee | |
| 7,248,454 B2 | 7/2007 | Takayanagi | |
| 7,575,216 B2 | 8/2009 | Zimmermann et al. | |
| 7,684,169 B1 | 3/2010 | Larkin | |
| 7,832,528 B1 | 11/2010 | Liang | |
| 7,971,689 B2 | 7/2011 | Moore | |
| 8,432,658 B1 | 4/2013 | Heise | |
| 8,503,154 B2 | 8/2013 | Nakai | |
| 8,932,464 B2 | 1/2015 | Byrd et al. | |
| 9,044,916 B2 | 6/2015 | Koike et al. | |
| 2002/0179311 A1 | 12/2002 | Alper | |
| 2003/0183465 A1 | 10/2003 | Ikeda | |
| 2005/0018375 A1 | 1/2005 | Takayanagi | |
| 2006/0213422 A1 | 9/2006 | Zimmermann et al. | |
| 2008/0036241 A1 | 2/2008 | Aisenbrey | |
| 2009/0242334 A1 | 10/2009 | Moore | |
| 2010/0154643 A1 | 6/2010 | Goto et al. | |
| 2012/0039012 A1 | 2/2012 | Nakai | |
| 2013/0291837 A1 | 11/2013 | Johnson et al. | |
| 2014/0209209 A1 | 7/2014 | Aitken | |
| 2015/0327352 A1 | 11/2015 | Kikuchi et al. | |
| 2016/0059838 A1 | 3/2016 | Yamada et al. | |
| 2016/0108868 A1 | 4/2016 | Tanahashi et al. | |
| 2016/0177811 A1 | 6/2016 | Tanahashi et al. | |
| 2016/0186639 A1 | 6/2016 | Tanahashi et al. | |
| 2016/0200270 A1 | 7/2016 | Tanahashi et al. | |
| 2016/0208748 A1 | 7/2016 | Tanahashi et al. | |
| 2016/0214453 A1 | 7/2016 | Tanahashi et al. | |
| 2016/0223024 A1 | 8/2016 | Tanahashi et al. | |
| 2016/0230824 A1 | 8/2016 | Tanahashi et al. | |
| 2016/0280162 A1 | 9/2016 | Yamada et al. | |

FOREIGN PATENT DOCUMENTS

| | | |
|---|---|---|
| DE | 102010003789 A1 | 10/2011 |
| EP | 1116621 A1 | 7/2001 |
| EP | 3009653 A1 | 4/2016 |
| GB | 824448 A | 12/1959 |
| JP | S50-26778 A | 3/1975 |
| JP | 61-194999 U1 | 12/1986 |
| JP | H03140216 A | 6/1991 |
| JP | H05-238438 A | 9/1993 |
| JP | H06003396 A | 1/1994 |
| JP | 2001-355524 A | 12/2001 |
| JP | 2002-104106 A | 4/2002 |
| JP | 2005291168 A | 10/2005 |
| JP | 2006-234093 A | 9/2006 |
| JP | 2008-181694 A | 8/2008 |
| JP | 2010-192177 A | 9/2010 |
| JP | 3194675 U | 11/2014 |
| JP | 2016078640 A | 5/2016 |
| WO | 8701301 A1 | 3/1987 |
| WO | 2013/061650 A1 | 5/2013 |
| WO | 2015/064195 A1 | 5/2015 |

OTHER PUBLICATIONS

U.S. Patent and Trademark Office, Corrected Notice of Allowability dated Jan. 9, 2018 in U.S. Appl. No. 15/018,085, 4 pages.
U.S. Patent and Trademark Office, Corrected Notice of Allowability dated Feb. 2, 2018 in U.S. Appl. No. 15/018,085, 4 pages.
Notice of Allowance dated Oct. 20,2017, issued to U.S. Appl. No. 15/018,085.
US Patent and Trademark Office, Final Office Action issued in U.S. Appl. No. 15/018,085, dated Jun. 7, 2017, 14 pages.
Office Action issued in U.S. Appl. No. 15/018,085 dated Dec. 14, 2016.
Office Action issued to U.S. Appl. No. 14/979,671 dated Nov. 3, 2017.
Notice of Allowance issued to U.S. Appl. No. 14/922,385 dated Dec. 19, 2017.
Final Office Action dated Jun. 5, 2018; issued by the U.S. Patent and Trademark Office in U.S. Appl. No. 14/979,671, 24 pages.
Untied States Patent and Trademark Office, Notice of Allowance issued to U.S. Appl. No. 14/979,671, dated Sep. 27, 2018, 13 pages.
United States Patent and Trademark Office, Corrected Notice of Allowability issued to U.S. Appl. No. 14/979,671 dated Jan. 9, 2019, 6 pages.

* cited by examiner

INTAKE SYSTEM OF VEHICLE

INCORPORATION BY REFERENCE

The disclosure of Japanese Patent Application No. 2014-263679 filed on Dec. 25, 2014 including the specification, drawings and abstract is incorporated herein by reference in its entirety.

BACKGROUND OF THE INVENTION

1. Field of the Invention

The invention relates to an intake system of a vehicle.

2. Description of Related Art

A vehicle is publicly known, in which a discharge device such as a discharge antenna is mounted on an engine or an engine-related member of the vehicle, and high-voltage electricity, static electricity and so on generated and charged in the engine area is discharged and emitted outside, thereby improving fuel economy (for example, see Japanese Patent Application Publication No. 5-238438 (JP 5-238438 A)).

SUMMARY OF THE INVENTION

As described in JP 5-238438 A, it is known that static electricity is charged to a vehicle, and that static electricity charged to a vehicle have some kind of influence on driving of the vehicle. However, specifically why and how the static electricity charged to a vehicle affects driving of the vehicle is not known for sure. However, without clearly knowing specifically why and how static electricity charged to a vehicle affects driving of the vehicle, it is not possible to appropriately deal with static electricity charged to a vehicle.

Therefore, the inventors paid attention especially to an air cleaner, and pursued specifically why and how static electricity charged to an air cleaner affects driving of a vehicle. As a result of the pursuit, the inventors found that static electricity charged to an air filter of an air cleaner greatly affects intake efficiency of intake air, and also found an adequate static elimination method required for improving intake efficiency of intake air based on the fact found.

An intake system of a vehicle according to an aspect of the invention includes an air cleaner case, an air filter that is arranged inside the air cleaner case and positively charged, and a self discharge type static eliminator that decreases an amount of electrification charge on a wall surface of the air cleaner case within a limited range about a location where the self discharge type static eliminator is installed, when the self discharge type static eliminator is installed on the wall surface of the air cleaner case. A peripheral edge part of the air filter is held by an air filter holding part of the air cleaner case. The self discharge type static eliminator is installed on an outer wall surface of the air filter holding part of the air cleaner case.

By installing the self discharge type static eliminator on the outer wall surface of the air filter holding part of the air cleaner case, static elimination of the air filter is performed. Thus, intake efficiency of intake air is improved significantly.

In the foregoing aspect, the air cleaner case may include an air inflow-side air cleaner case and an air outflow-side air cleaner case, and the peripheral edge part of the air filter may be held at a connecting part between the air inflow-side air cleaner case and the air outflow-side air cleaner case. The self discharge type static eliminator may be installed on an outer wall surface of the connecting part between the air inflow-side air cleaner case and the air outflow-side air cleaner case.

In the foregoing structure, the air inflow-side air cleaner case and the air outflow-side air cleaner case may be provided with connection flanges, respectively, in the connection part between the air inflow-side air cleaner case and the air outflow-side air cleaner case. The connection flanges project outwardly from an outer wall surface of the air inflow-side air cleaner case and an outer wall surface of the air outflow-side air cleaner case, respectively. The peripheral edge part of the air filter may be held between the connection flange of the air inflow-side air cleaner case and the connection flange of the air outflow-side air cleaner case. The self discharge type static eliminator may be installed on at least one of an outer wall surface of the connection flange of the air inflow-side air cleaner case, and an outer wall surface of the connection flange of the air outflow-side air cleaner case.

In the foregoing structure, the air filter may include filter paper and a filter paper support frame that supports a periphery of the filter paper, and the filter paper support frame may be held between the connection flange of the air inflow-side air cleaner case and the connection flange of the air outflow-side air cleaner case.

In the foregoing aspect, the air cleaner case may be made from a non-conductive synthetic resin material.

In the foregoing aspect, the self discharge type static eliminator may be metallic foil that is adhered onto a wall surface of the air cleaner case by a conductive adhesive.

In the foregoing structure, the self discharge type static eliminator may have a corner part.

In the foregoing structure, the self discharge type static eliminator may have a long and narrow rectangular flat plate shape.

In the foregoing structure, the self discharge type static eliminator may have a sharp end part.

In the foregoing structure, the self discharge type static eliminator may be formed integrally on a wall surface of the air cleaner case.

According to the above structure, it is possible to obtain effects similar to those obtained in the foregoing aspect.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
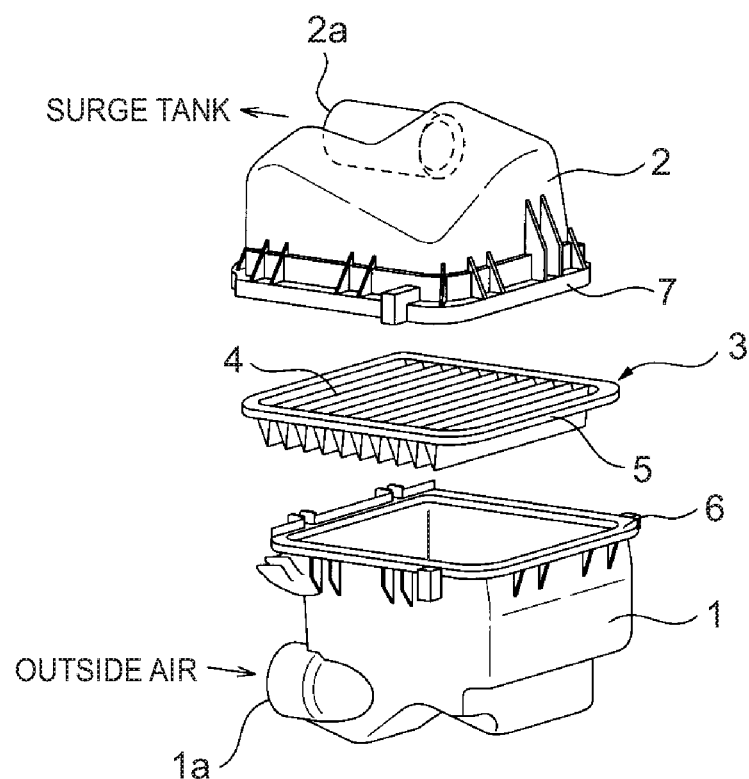
FIG. 1 is an exploded perspective view of an air cleaner.

FIG. 1 shows an exploded perspective view of an air cleaner. With reference to FIG. 1, reference numeral 1 shows an air inflow-side air cleaner case having an outside air inlet 1a, reference numeral 2 shows an air outflow-side air cleaner case having an air outflow port 2a. In short, in the air cleaner shown in FIG. 1, an air cleaner case is structured from the air inflow-side air cleaner case 1 and the air outflow-side air cleaner case 2. The air inflow-side air cleaner case 1 and the air outflow-side air cleaner case 2, or the air cleaner case, is formed from a non-conductive synthetic resin material. Meanwhile, in FIG. 1, reference numeral 3 shows an air filter. The air filter 3 is made from convoluted filter paper 4 and a filter paper support frame 5 that supports the periphery of the filter paper 4 throughout the entire circumference. In the example shown in FIG. 1, the filter paper support frame 5 is formed from a rubber material.

Figure 4:
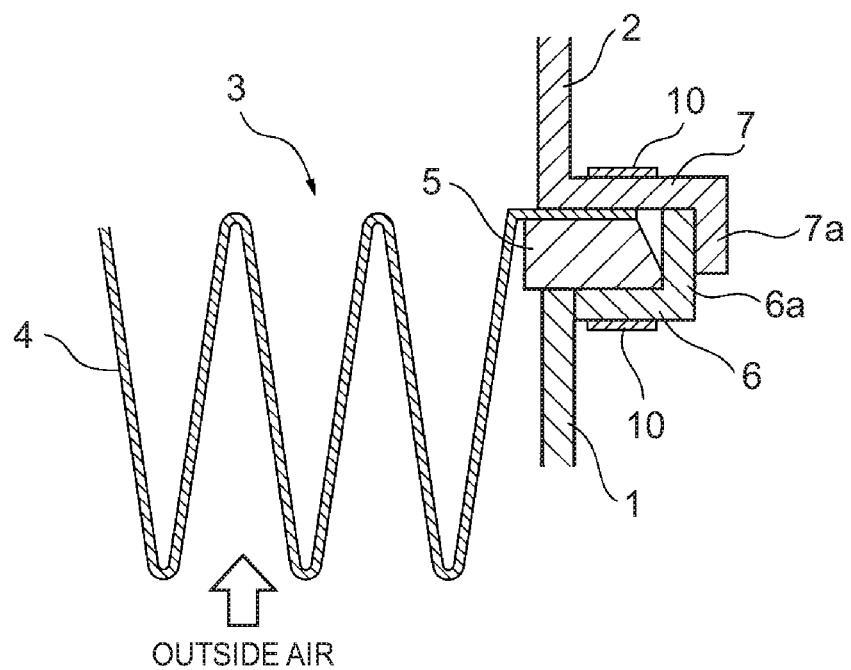
FIG. 4 is a partial enlarged sectional view of the air cleaner, taken along the line A-A in FIG. 2.

As shown in FIG. 1, a connection flange 6 is formed in an upper end part of the air inflow-side air cleaner case 1 throughout the entire circumference of the upper end part. The connection flange 6 projects outwardly from an outer wall surface of the upper end part of the air inflow-side air cleaner case 1. An connection flange 7 is formed in a lower end part of the air outflow-side air cleaner case 2 throughout the entire circumference of the lower end part. The connection flange 7 projects outwardly from an outer wall surface of the lower end part of the air outflow-side air cleaner case 2. The air inflow-side air cleaner case 1 and the air outflow-side air cleaner case 2 are integrated with each other by fastening the connection flanges 6, 7 of the air inflow-side air cleaner case 1 and the air outflow-side air cleaner case 2 to each other. FIG. 4 shows a partial enlarged sectional view of the air cleaner case integrated as stated above. The sectional view is taken along the line A-A in FIG. 2.

As this time, as seen in FIG. 4, the filter paper support frame 5, or a peripheral edge part of the air filter 3, is held between the connection flange 6 of the air inflow-side air cleaner case 1 and the connection flange 7 of the air outflow-side air cleaner case 2. As shown in FIG. 4, a flange end part 6a extends upwardly or towards the connection flange 7 from an outer peripheral edge of the connection flange 6. A flange end part 7a extends downwardly from an outer peripheral edge of the connection flange 7 so as to cover an outer peripheral surface of the flange end part 6a.

Figure 2:
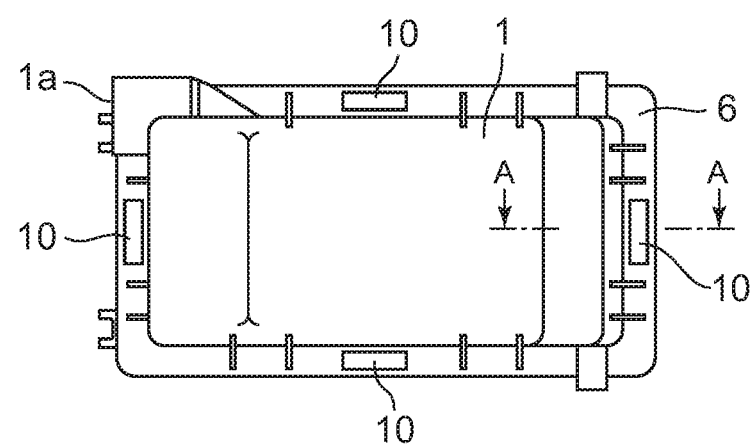
FIG. 2 is a bottom view of an air inflow-side air cleaner case shown in FIG. 1.
Figure 3:
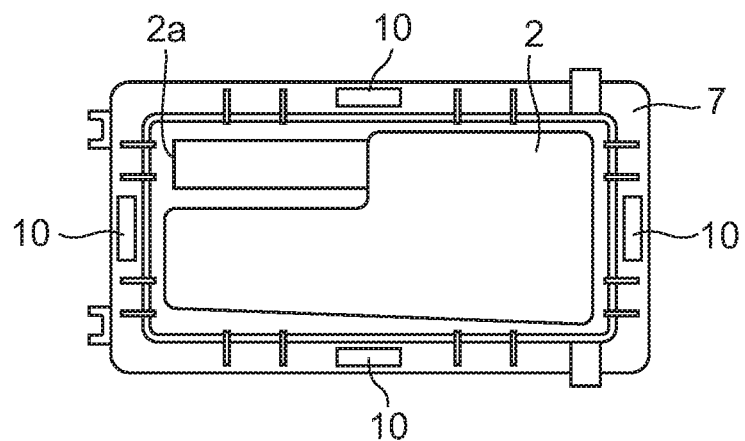
FIG. 3 is a top view of an air outflow-side air cleaner case shown in FIG. 1.

Once driving of an engine begins, outside air is drawn into the air inflow-side air cleaner case 1 from the outside air inlet 1a. Then, the outside air, or air, passes through the filter paper 4 and is drawn into the air outflow-side air cleaner case 2. Thereafter, the outside air passes through the air outflow port 2a and is drawn into an air intake system of the engine, for example, a surge tank. FIG. 2 shows a bottom view of the air inflow-side air cleaner case 1, which is a view of the air inflow-side air cleaner case 1 in FIG. 1 seen from the bottom. FIG. 3 is a plan view of the air outflow-side air cleaner case 2, which is a view of the air outflow-side air cleaner case 2 in FIG. 1 seen from the top.

Once a vehicle is run, each part of tires comes into contact with and is separated from a road surface repeatedly, and static electricity is thus generated. Static electricity is also generated as components of the engine, and components of a braking device move relative to each other. Further, static electricity is generated due to air that flows on and is in frictional contact with an outer peripheral surface of the vehicle when the vehicle is running. Because of the static electricity generated as above, the vehicle's body, engine, and so on of the vehicle are charged, and an air cleaner is also charged. In such a case, it is confirmed that a surface of the air cleaner case made from a non-conductive synthetic resin material, that means surfaces of the air inflow-side air cleaner case 1 and the air outflow-side air cleaner case 2, as well as the air filter 3 are positively charged. Moreover, it is confirmed that there are instances where a voltage value of the surfaces of the air cleaner cases 1, 2 and the air filter 3 is a voltage as high as 1000 (v) or higher.

Figure 6A:
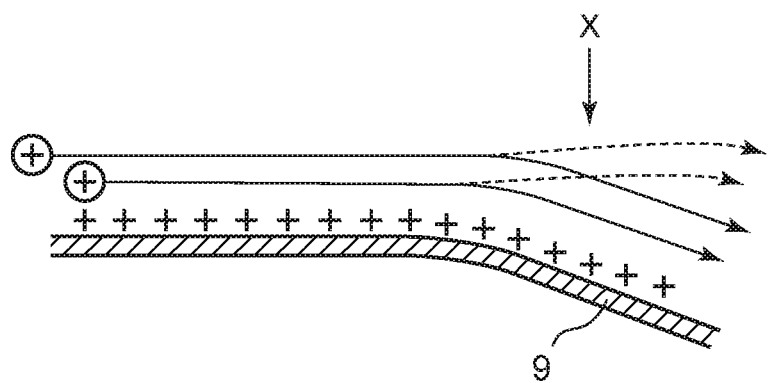
FIG. 6A is a view for explaining a change of an intake air flow.

It is confirmed that, when a voltage value becomes high on a surface of a thin wall made from a non-conductive synthetic resin material, a flow of air along the surface of the thin wall changes. Thus, to begin with, explanation is given about phenomena confirmed by the inventors with regard to how an air flow along the surface of the thin wall changes in accordance with a voltage value on the surface of the thin wall. FIG. 6A shows a case where air flows along a surface of a thin wall 9 that is positively charged. In this case, since air tends to be positively charged, FIG. 6A shows a case where positively-charged air flows along the surface of the thin wall 9 that is positively charged. In FIG. 6A, solid-line arrows show a case where a voltage value on the surface of the thin wall 9 is low, and, in this case, air flows along the surface of the thin wall 9. On the contrary, broken-line arrows show a case where a voltage value on the surface of the thin wall 9 is high, and, in this case, air flows so as to be separated from the surface of the thin wall 9 at a point where the surface of the thin wall 9 curves downwardly, or a point where the air flow is easily separated from the surface of the thin wall 9.

Figure 6B:
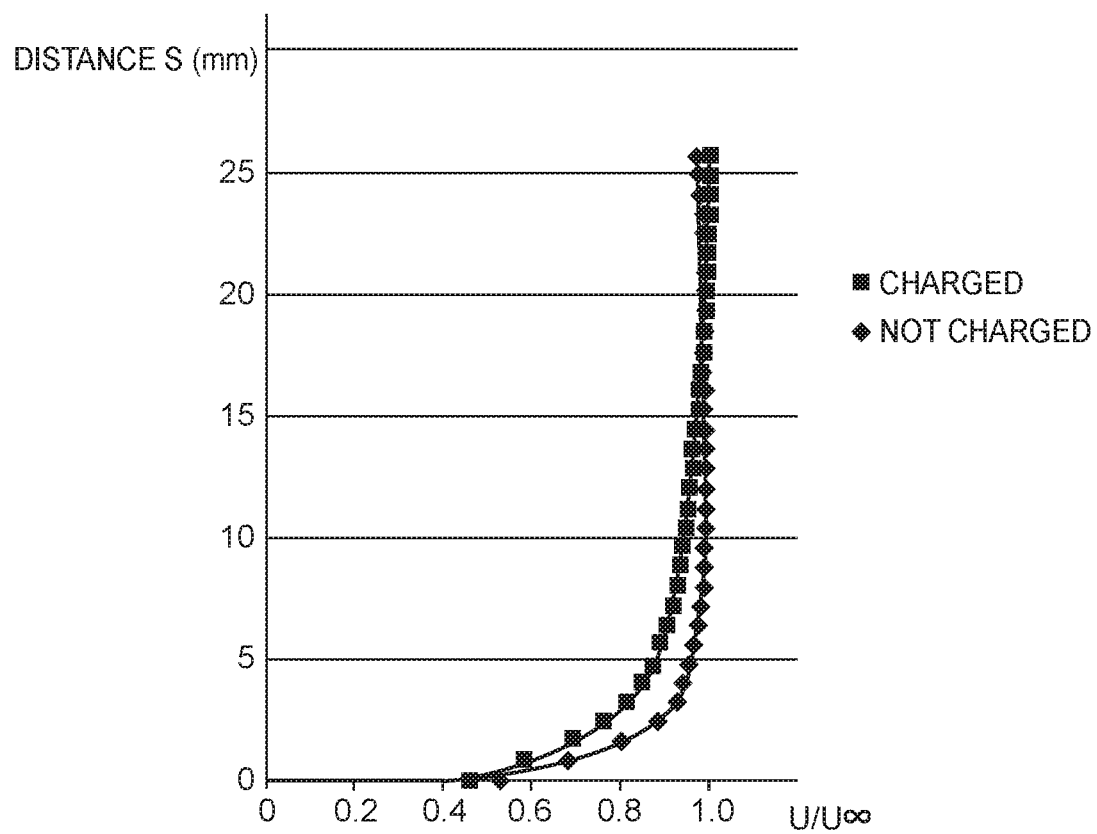
FIG. 6B is a view for explaining the change of the intake air flow.

FIG. 6B shows measured values of a velocity ratio $U/U_\infty$, at point X (FIG. 6A), between a flow velocity $U_\infty$ of a main flow of air that flows along the surface of the thin wall 9 in FIG. 6A, and a flow velocity U at a point away from the surface of the thin wall 9 by a distance S. Each point shown by a black rhombus in FIG. 6B shows a case where the surface of the thin wall 9 is not positively charged, and each point shown by a black quadrangle in FIG. 6B shows a case where the surface of the thin wall 9 is positively charged. It is understood from FIG. 6B that, in the case where the surface of the thin wall 9 is positively charged, a velocity boundary layer is separated more from the surface of the thin wall 9 compared to the case where the surface the thin wall 9 is not positively charged. Therefore, in the case where the surface of the thin wall 9 is positively charged, air flows so as to be separated from the surface of the thin wall 9 as shown by broken-line arrows in FIG. 6A.

As stated above, air tends to be positively charged. Therefore, positive air ions (expressed as + in a circle) are present in a part of air. Accordingly, when the surface of the thin wall 9 is positively charged, repulsive force acts between the positive air ions and the surface of the thin wall 9. Thus, as shown by the broken-line arrows in FIG. 6A, air flows so as to be separated from the surface of the thin wall 9 at the point where the surface of the thin wall 9 is curved downwardly, or the point where the air flow is easily separated from the surface of the thin wall 9. It is confirmed from an experiment that an air flow along the surface of the thin wall 9 is separated from the surface of the thin wall 9 because of positive charge on the surface of the thin wall 9. In this case, it is known that the higher the voltage value becomes on the surface of the thin wall 9, the more the air flow along the surface of the thin wall 9 is separated from the surface of the thin wall 9.

In a case where the surface of the thin wall 9 has a shape that easily causes separation of the air flow, the air flow is not separated when the surface of the thin wall 9 is not positively charged. However, it is confirmed that an air flow could be separated when the surface of the thin wall 9 is positively charged. It is also confirmed that, when the surface of the thin wall 9 is positively charged, a degree of separation of an air flow is greater than that in the case where the surface of the thin wall 9 is not positively charged. In this way, it is confirmed that, when the surface of the thin wall 9 is positively charged, an air flow is separated from the surface of the thin wall 9 or separation of air happens based on electrical repulsive force.

Figure 7A:
FIG. 7A is a view showing a self discharge type static eliminator.
Figure 7B:
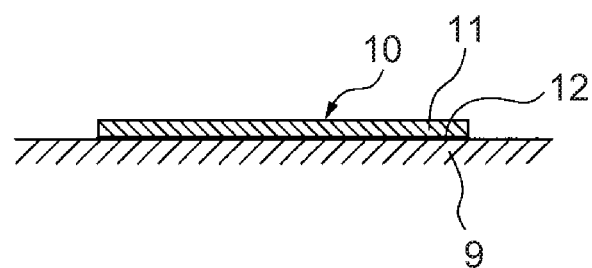
FIG. 7B is a view showing the self discharge type static eliminator.
Figure 7C:
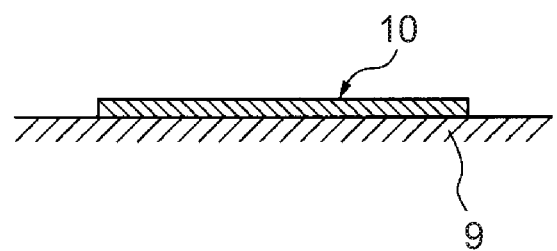
FIG. 7C is a view showing a self discharge type static eliminator.

As stated above, when the surface of the thin wall 9 is positively charged, an air flow becomes different from a flow that is originally intended. In this case, once positive charge on the surface of the thin wall 9 is entirely or partially eliminated, or static elimination of the surface of the thin wall 9 is performed, to decrease the voltage value of the surface of the thin wall 9, it is possible to bring the air flow along the surface of the thin wall 9 back to an air flow in the case where the surface of the thin wall 9 is not positively charged. This means that, by the static elimination, the air flow is restored to an air flow that is originally intended. Thus, the inventors considered an easy static elimination method for restoring an air flow to one originally intended, and found an easy static elimination method using a self discharge type static eliminator. FIG. 7A to FIG. 7C show examples of this self discharge type static eliminator. FIG. 7A and FIG. 7B show a plan view and a side sectional view of a typical self discharge type static eliminator 10, respectively. FIG. 7C shows a side sectional view of another self discharge type static eliminator 10.

In the example shown in FIG. 7A and FIG. 7B, the self discharge type static eliminator 10 has a long and narrow rectangular flat plate shape, and is also formed from metallic foil 11 that is adhered onto the surface of the thin wall 9 by a conductive adhesive 12. Meanwhile, in the example shown in FIG. 7C, the self discharge type static eliminator 10 is made from a conductive thin film that is formed integrally with the surface of the thin wall 9. In the invention, static elimination of the air filter 3 is performed by using the self discharge type static eliminator 10. Before giving explanation of the static elimination method for the air filter 3, a basic static elimination method using the self discharge type static eliminator 10 according to the invention is explained first using an example case where static elimination of the surface of the thin wall 9 is performed by the self discharge type static eliminator 10.

Figure 8A:
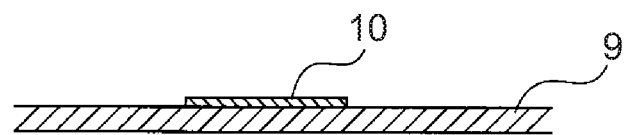
FIG. 8A is a view for explaining a static elimination effect by the self discharge type static eliminator.
Figure 8B:
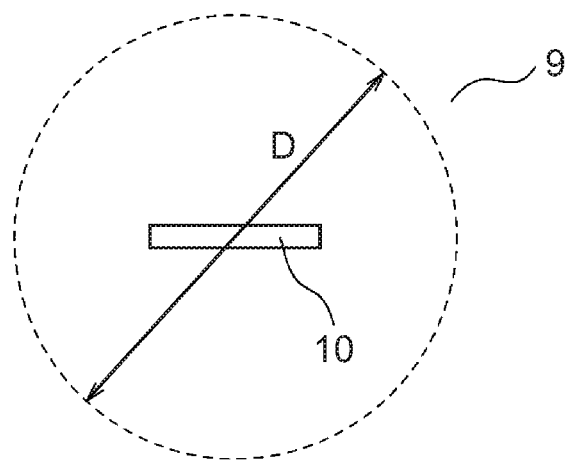
FIG. 8B is a view for explaining the static elimination effect by the self discharge type static eliminator elimination effect.
Figure 8C:
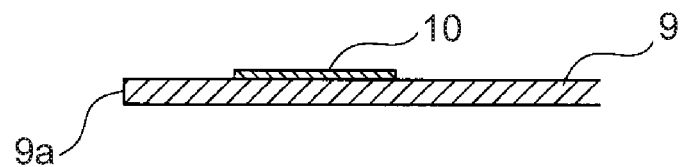
FIG. 8C is a view for explaining the static elimination effect by the self discharge type static eliminator.

FIG. 8A shows a case where the self discharge type static eliminator 10 shown in FIG. 7A and FIG. 7B is installed on the surface of the thin wall 9. When the self discharge type static eliminator 10 is installed on the surface of the thin wall 9 as stated above, an amount of electrification charge of the surface of the thin wall 9 is reduced within a limited range shown by a broken line about the location where the self discharge type static eliminator 10 is installed as shown in FIG. 8B. As a result, it is confirmed that voltage of the surface of the thin wall 9 within the limited range shown by the broken line in FIG. 8B is decreased. FIG. 8C shows a case where the self discharge type static eliminator 10 is installed in the vicinity of an end part 9a of the thin wall 9. It is confirmed that, in this case, not only an amount of electrification charge, or voltage, on the surface of the thin wall 9 is reduced, but also an amount of electrification charge, or voltage, of a rear surface of the thin wall 9 is reduced by the self discharge type static eliminator 10.

Figure 9A:
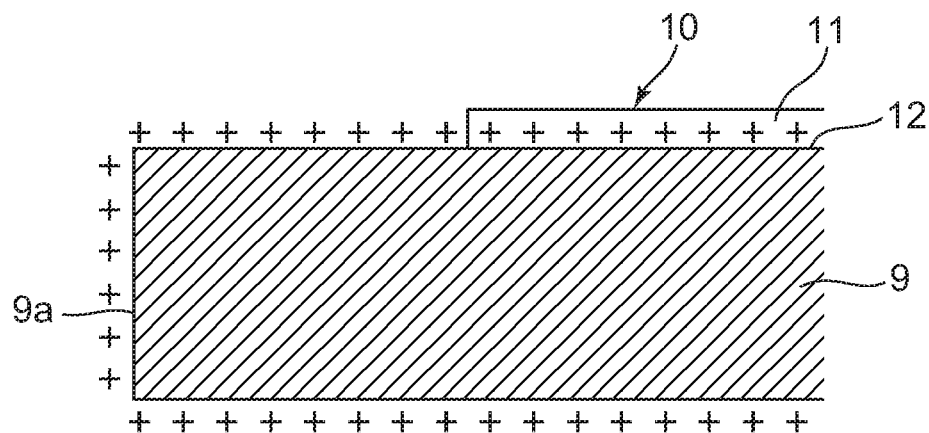
FIG. 9A is a view for explaining a self discharge effect.

In this case, although it is not clear about static elimination mechanism when static elimination of the surface and the rear surface of the thin wall 9 is performed by the self discharge type static eliminator 10, it is presumed that, because of an effect of the self discharge type static eliminator 10 for discharging positive charge, a static elimination effect could be performed on the surface and the rear surface of the thin wall 9 around the location where the self discharge type static eliminator 10 is installed. Next, the static elimination mechanism, which is presumed to be carried out on the surface of the thin wall 9, is explained with reference to FIG. 9A showing an enlarged sectional view of the thin wall 9 shown in FIG. 8C, and FIG. 9B showing an enlarged view of an end part of the self discharge type static eliminator 10 shown in FIG. 9A.

As stated above, the thin wall 9 is formed from a non-conductive synthetic resin material. When the thin wall 9 is formed from a non-conductive synthetic resin material as stated above, inside of the thin wall 9 is not charged, and the surface of the thin wall 9 is charged. It is confirmed that both the surface and rear surface of the air cleaner cases 1, 2 shown in FIG. 1 are charged positively. In the example according to the invention, in order to perform static elimination of the air filter 3, static elimination is performed on parts of the surfaces and the rear surfaces of the air cleaner cases 1, 2. Therefore, assuming a case where static elimination is performed on parts of the surface and the rear surface of the air cleaner cases 1, 2, FIG. 9A shows a case where both the surface and the rear surface of the thin wall 9 are positively charged. Meanwhile, as stated earlier, the self discharge type static eliminator 10 is the metallic foil 11 adhered to the surface of the thin wall 9 by the conductive adhesive 12. Since both the metallic foil 11 and the conductive adhesive 12 have conductivity, inside of the metallic foil 11, that means inside of the self discharge type static eliminator 10, is positively charged.

Voltage of the self discharge type static eliminator 10 is about the same as voltage on the surface of the thin wall 9 around the self discharge type static eliminator 10. Therefore, the voltage of the self discharge type static eliminator 10 is quite high. Meanwhile, because air tends to be positively charged as stated earlier, positive air ions (expressed as + in a circle) are present in a part of air. In this case, in comparison between electrical potential of the air ion, and electrical potential of the self discharge type static eliminator 10, the electrical potential of the self discharge type static eliminator 10 is much higher than the electrical potential of the air ion. Therefore, when the air ion comes close to, for example, a corner part 13 of the self discharge type static eliminator 10 as shown in FIG. 9B, a field intensity increases between the air ion and the corner part 13 of the self discharge type static eliminator 10. As a result, discharge happens between the air ion and the corner part 13 of the self discharge type static eliminator 10.

Figure 9B:
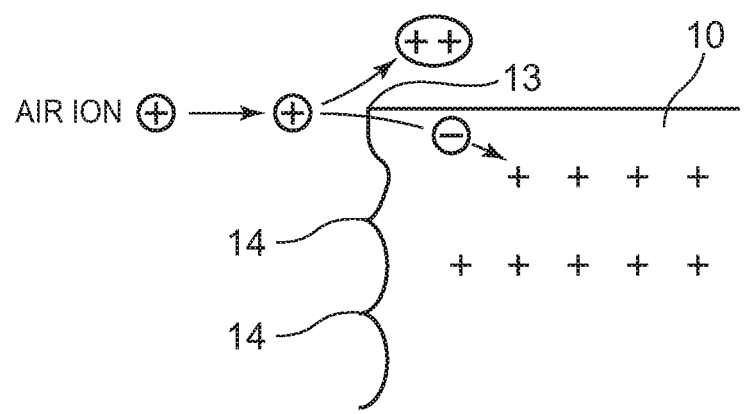
FIG. 9B is a view for explaining the self discharge effect.

Once discharge happens between the air ion and the corner part 13 of the self discharge type static eliminator 10, some electrons of the air ions move into the self discharge type static eliminator 10 as shown in FIG. 9B. Therefore, a positive charge amount of the air ion is increased (expressed as ++ in a circle), and an electron that has moved into the self discharge type static eliminator 10 neutralizes positive charge on the self discharge type static eliminator 10. Once discharge is performed, discharge occurs easily, and, when another air ion comes close to the corner part 13 of the self discharge type static eliminator 10, discharge happens immediately between the air ion and the corner part 13 of the self discharge type static eliminator 10. In short, when air moves around the self discharge type static eliminator 10, air ions move close to the corner part 13 of the self discharge type static eliminator 10 one after another. Therefore, discharge happens continuously between air ions and the corner part 13 of the self discharge type static eliminator 10.

Once discharge happens continuously between air ions and the corner part 13 of the self discharge type static eliminator 10, positive charge on the self discharge type static eliminator 10 is neutralized in succession. As a result, a positive charge amount on the self discharge type static eliminator 10 is reduced. Once the positive charge amount on the self discharge type static eliminator 10 is reduced, positive charge on the surface of the thin wall 9 around the self discharge type static eliminator 10 moves into the self discharge type static eliminator 10. Therefore, a positive charge amount on the surface of the thin wall 9 around the self discharge type static eliminator 10 is also reduced. As a result, voltage on the self discharge type static eliminator 10 and the surface of the thin wall 9 around the self discharge type static eliminator 10 is decreased gradually. This effect of decreasing voltage on the self discharge type static eliminator 10 and the surface of the thin wall 9 around the self discharge type static eliminator 10 continues until voltage on the self discharge type static eliminator 10 is reduced and the discharge effect is stopped. As a result, as shown in FIG. 8B, voltage on the surface of the thin wall 9 is reduced within the limited range shown by the broken line about the location where the self discharge type static eliminator 10 is installed. In this case, in the example shown in FIG. 8C, when a positive charge amount on the self discharge type static eliminator 10 is reduced, positive charge on the surface and the rear surface of the thin wall 9 around the self discharge type static eliminator 10 moves into the self discharge type static eliminator 10. As a result, voltage on the surface and the rear surface of the thin wall 9 is decreased.

Meanwhile, as stated earlier, once discharge happens between an air ion and the corner part 13 of the self discharge type static eliminator 10, an air ion with an increased positive charge amount (expressed as ++ in a circle) is generated as shown in FIG. 9B, and the air ion with the increased positive charge amount is dispersed into circumambient air. The amount of air ions with the increased positive charge amount is extremely smaller than the amount of air flowing around the self discharge type static eliminator 10. When air around the self discharge type static eliminator 10 is stagnant and air ions do not move, discharge does not happen continuously, and voltage on the surface of the thin wall 9 is not decreased. This means that it is necessary to make air around the self discharge type static eliminator 10 flow in order to decrease voltage on the surface of the thin wall 9. Also, when the engine is operating, the air in an engine room accommodating the air cleaner cases flows due to drawing of the air into the engine.

Discharge between an air ion and the self discharge type static eliminator 10 happens between the air ion and the corner part 13 of the self discharge type static eliminator 10, or between the air ion and sharp end parts 14 in a peripheral part of the self discharge type static eliminator 10. Therefore, in order to make discharge happen easily between an air ion and the self discharge type static eliminator 10, it is preferred that a number of sharp end parts 14 are formed, in addition to the corner part 13, in the peripheral part of the self discharge type static eliminator 10. Hence, when fabricating the self discharge type static eliminator 10, it is preferred that metallic foil is cut so that burrs like the sharp end parts 14 are made in the section when fabricating the metallic foil 11 by cutting large metallic foil.

The metallic foil 11 of the self discharge type static eliminator 10 shown in FIG. 7A and FIG. 7B is made from ductile metal such as aluminum or copper. The metallic foil 11 in the example according to the invention is aluminum foil. Further, a longitudinal length of the aluminum foil 11 used in the example according to the invention is between about 50 mm and 100 mm, and a thickness is between about 0.05 mm and 0.2 mm. In this case, a diameter D of the limited range shown by the broken line in FIG. 8B, in which voltage is reduced, is between about 150 mm and 200 mm. An aluminum tape, in which a layer of conductive adhesive 12 is formed on the aluminum foil 11, may be cut and used as the self discharge type static eliminator 10. Further, as shown in FIG. 7C, the self discharge type static eliminator 10 may be structured from a conductive thin film that is formed integrally with the surface of the thin wall 9. In this case, it is also preferred that a number of sharp end parts 14 are formed, in addition to the corner part 13, in a peripheral part of the conductive thin film as shown in FIG. 9B.

As explained earlier, it is confirmed that a voltage value on the surfaces of the air cleaner cases 1, 2 and the surface of the air filter 3 becomes as high as 1000 (v) or higher. In this case, judging from the experiment results shown in FIG. 6A and FIG. 6B, a flow of intake air flowing inside the filter paper 4 of the air filter 3 is changed by the high voltage, which presumably affects intake efficiency. Thus, an experiment was carried out regarding intake efficiency. As a result, it was found that intake efficiency was deteriorated when a voltage value on the surface of the filter paper 4 was high. It was also found that, in this case, intake efficiency was improved when the self discharge type static eliminator 10 was installed in the air filter holding part of the air cleaner case.

Figure 5A:
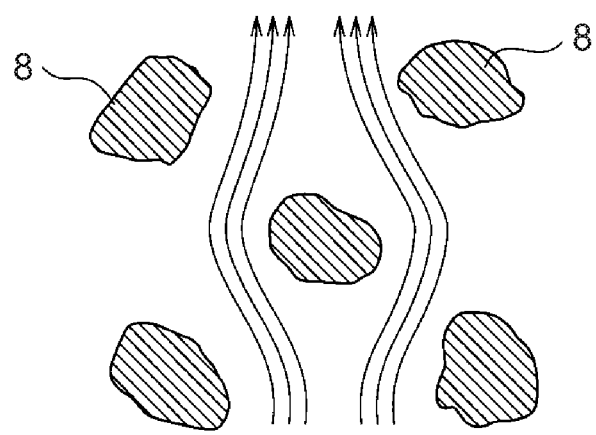
FIG. 5A is a view for explaining an intake air flow within filter paper of an air filter.
Figure 5B:
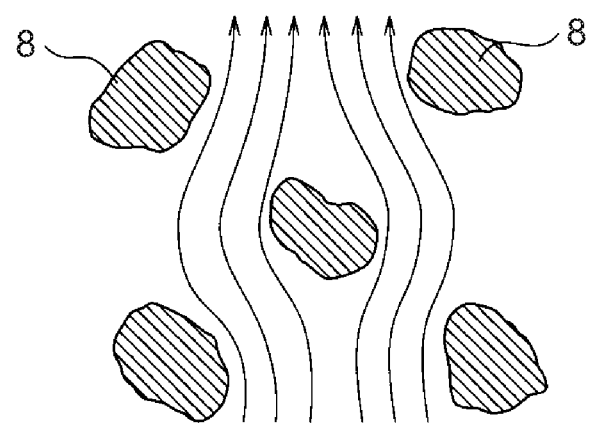
FIG. 5B is a view for explaining an intake air flow within the filter paper of the air filter.

First, with reference to FIG. 5A and FIG. 5B, explanation is given about the reason for the deterioration of intake efficiency when a voltage value on the surface of the filter paper 4 is high. FIG. 5A and FIG. 5B show enlarged views of sections of the filter paper 4, and reference numeral 8 in FIG. 5A and FIG. 5B shows fiber that structures the filter paper 4. FIG. 5B shows a flow of intake air when voltage of the filter paper 4 is low, and, intake air in this case flows along a peripheral wall surface of the fiber 8 as shown by arrows. However, when voltage of the filter paper 4 becomes high due to static electricity charge, intake air flowing along the peripheral wall surface of the fiber 8 is separated from the peripheral wall surface of the fiber 8 by electrical repulsive force as shown by arrows in FIG. 5A. As a result, intake air has to flow away from the peripheral wall surface of the fiber 8.

When intake air has to flow away from the peripheral wall surface of the fiber 8 as stated above, a section of a flow passage for intake air is reduced, thereby increasing intake resistance. As a result, intake efficiency is deteriorated. In this case, if voltage of the filter paper 4 is decreased, the section of the flow passage for intake air increases, and intake efficiency is improved as shown in FIG. 5B. Thus, in the invention, the self discharge type static eliminator 10 is installed on the outer wall surface of the air filter holding part of the air cleaner case in order to reduce voltage of the filter paper 4. In the example of the invention, the self discharge type static eliminators 10 are installed on an outer wall surface of the connection flange 6 of the air inflow-side air cleaner case 1 as shown in FIG. 2 and FIG. 4.

When the self discharge type static eliminators 10 are installed on the outer wall surface of the connection flange 6 of the air inflow-side air cleaner case 1, electrification charge within certain ranges about the self discharge type static eliminators 10 is eliminated by a static elimination effect produced by the self discharge type static eliminators 10. Thus, voltage on the surface and rear surface of the connection flange 6, and voltage of the surface and the rear surface of the flange end part 6a are decreased. Once voltage on the rear surface of the connection flange 6 and voltage of the rear surface of the flange end part 6a are decreased, voltage of the filter paper support frame 5, which is in contact with the connection flange 6 and the flange end part 6a, is decreased. Further, voltage of the filter paper 4 supported by the filter paper support frame 5 is decreased. This means that voltage of the air filter 3 is decreased, and, as a result, intake efficiency is improved.

Meanwhile, as shown in FIG. 3 and FIG. 4, when the self discharge type static eliminators 10 are installed on an outer wall surface of the connection flange 7 of the air outflow-side air cleaner case 2, electrification charge within a certain range about the self discharge type static eliminators 10 is also eliminated by the static elimination effect produced by the self discharge type static eliminators 10. Thus, voltage of the surface and the rear surface of the connection flange 7, and voltage of the surface and the rear surface of the flange end part 7a are decreased. Once voltage of the rear surface of the connection flange 7 and voltage of the rear surface of the flange end part 7a are decreased, voltage of the filter paper 4, which is in contact with the connection flange 7, and voltage of the filter paper support frame 5 are decreased. This means that voltage of the air filter 3 is decreased, and, as a result, the intake efficiency is improved.

In this case, voltage of the filter paper 4 is decreased when the self discharge type static eliminator 10 is installed on either one of the outer wall surface of the connection flange 6, and the outer wall surface of the connection flange 7. Therefore, it is sufficient to install the self discharge type static eliminator 10 on either one of the outer wall surface of the connection flange 6 and the outer wall surface of the connection flange 7. The self discharge type static eliminator 10 is installed in a location so that the self discharge type static eliminator 10 is able to decrease voltage of an inner wall surface portion of the air inflow-side air cleaner case 1 or an inner wall surface portion of the air outflow-side air cleaner case 2 when the self discharge type static eliminator 10 is installed. The inner wall surface portions are in contact with the filter paper 4 or the filter paper support frame 5. Comprehensively expressed, the location is on the outer wall surface of the air filter holding part of the air cleaner case. Therefore, in the invention, the self discharge type static eliminator 10 is installed on the outer wall surface of the air filter holding part of the air cleaner case.

In short, in the invention, the self discharge type static eliminator 10 is provided in the air cleaner of a vehicle, in which the air cleaner case and the air filter 3 arranged inside the air cleaner case are positively charged. When installed on the wall surface of the air cleaner case, the self discharge type static eliminator 10 is able to reduce an amount of electrification charge on the wall surface of the air cleaner case within a limited range about a location where the self discharge type static eliminator 10 is installed. The peripheral edge part of the air filter 3 is held by the air filter holding part of the air cleaner case, and the self discharge type static eliminator 10 is installed on the outer wall surface of the air filter holding part of the air cleaner case, thereby performing static elimination of the air filter.

In this case, according to the example of the invention, the air cleaner case is made from the air inflow-side air cleaner case 1 and the air outflow-side air cleaner case 2. At the same time, the peripheral edge part of the air filter 3 is held at a connecting part between the air inflow-side air cleaner case 1 and the air outflow-side air cleaner case 2, and the self discharge type static eliminator 10 is installed on the outer wall surface of the connecting part between the air inflow-side air cleaner case 1 and the air outflow-side air cleaner case 2.

Further, according to the example of the invention, the air inflow-side air cleaner case 1 and the air outflow-side air cleaner case 2 have the connection flanges 6, 7, respectively, in the connecting part between the air inflow-side air cleaner case 1 and the air outflow-side air cleaner case 2 as shown in FIG. 4. The connection flanges 6, 7 project outwardly from the outer wall surface of the air inflow-side air cleaner case 1 and the outer wall surface of the air outflow-side air cleaner case 2, respectively. The peripheral edge part of the air filter 3 is held between the connection flange 6 of the air inflow-side air cleaner case 1, and the connection flange 7 of the air outflow-side air cleaner case 2, and the self discharge type static eliminator 10 is installed on at least one of the outer wall surface of the connection flange 6 of the air inflow-side air cleaner case 1, and the outer wall surface of the connection flange 7 of the air outflow-side air cleaner case 2.

As shown in FIG. 2, it is preferred that the plurality of self discharge type static eliminators 10 are installed at an equal interval on the outer wall surface of the connection flange 6 of the air inflow-side air cleaner case 1. Alternatively, as shown in FIG. 3, it is preferred that the plurality of self discharge type static eliminators 10 are installed at an equal interval on the outer wall surface of the connection flange 7 of the air outflow-side air cleaner case 2.

Figure 10A:
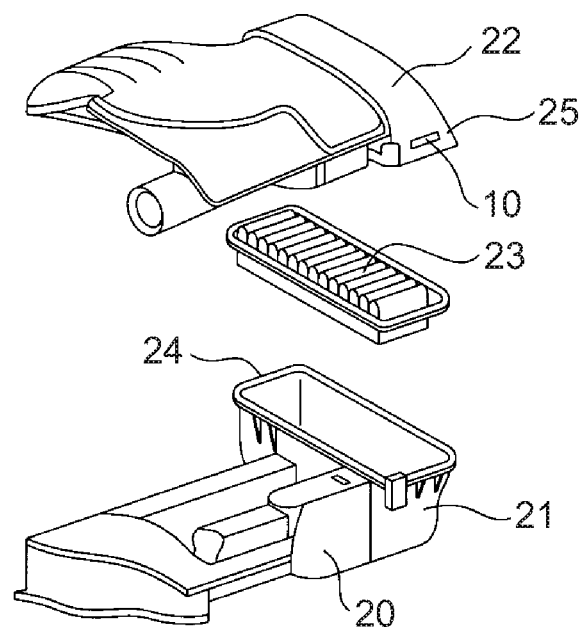
FIG. 10A is an exploded perspective view of an air cleaner according to another example.
Figure 10B:
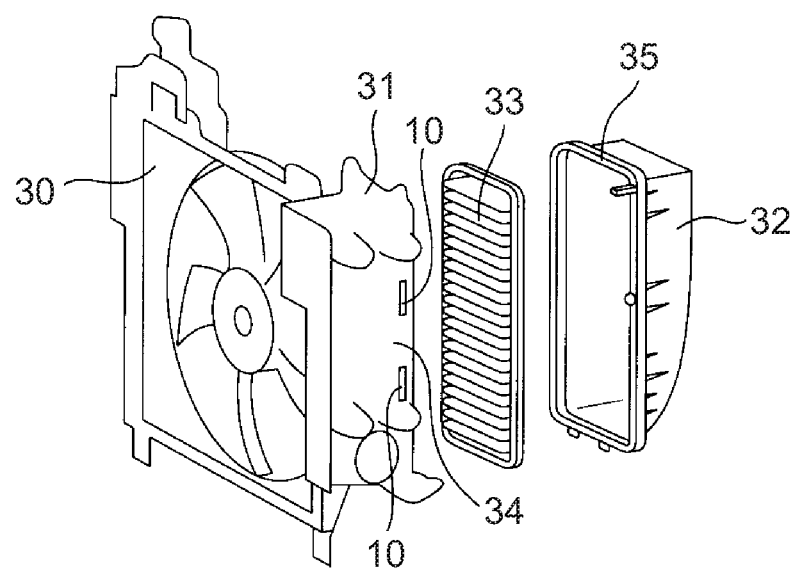
FIG. 10B is an exploded perspective view of an air cleaner according to another example.

Next, with reference to FIG. 10A and FIG. 10B, other examples of the air cleaner are explained. FIG. 10A shows an exploded perspective view of an air cleaner that is formed integrally with a cylinder head cover. Referring to FIG. 10A, in this example, the air cleaner is structured from an air inflow-side air cleaner case 21 that is formed integrally with a cylinder head cover 20 made from a non-conductive synthetic resin, an air outflow-side air cleaner case 22 made from a non-conductive synthetic resin material, and an air filter 23. In this example, a peripheral edge part of the air filter 23 is also held between a connection flange 24 of the air inflow-side air cleaner case 21 and a connection flange 25 of the air outflow-side air cleaner case 22.

In this example, similarly to the example shown in FIG. 2, a self discharge type static eliminator 10 is installed on an outer wall surface of the connection flange 24 of the air inflow-side air cleaner case 21. Alternatively, similarly to the example shown in FIG. 3, the self discharge type static eliminator 10 is installed on an outer wall surface of the connection flange 25 of the air outflow-side air cleaner case 22. When the self discharge type static eliminator 10 is installed as stated above, voltage of a surface and a rear surface of the connection flange 24 or 25 is decreased due to an static elimination effect produced by the self discharge type static eliminator 10, and voltage of the air filter 23 is decreased accordingly. As a result, intake efficiency is improved.

FIG. 10B shows an exploded perspective view of an air cleaner that is formed integrally with a fan cover mounted on a radiator. With reference to FIG. 10B, in this example, the air cleaner is structured from an air inflow-side air cleaner case 31 that is formed integrally with a fan cover 30 made from a non-conductive synthetic resin, an air outflow-side air cleaner case 32 made from a non-conductive synthetic resin material, and an air filter 33. In this example, a peripheral edge part of the air filter 33 is also held between a connection flange 34 of the air inflow-side air cleaner case 31, and a connection flange 35 of the air outflow-side air cleaner case 32.

In this example, similarly to the example shown in FIG. 2, a self discharge type static eliminator 10 is installed on an outer wall surface of the connection flange 34 of the air inflow-side air cleaner case 31. Alternatively, similarly to the example shown in FIG. 3, the self discharge type static eliminator 10 is installed on an outer wall surface of the connection flange 35 of the air outflow-side air cleaner case 32. When the self discharge type static eliminator 10 is installed as stated above, voltage of a surface and a rear surface of the connection flange 34 or 35 is decreased due to a static elimination effect produced by the self discharge type static eliminator 10, and voltage of the air filter 33 is reduced accordingly. As a result, intake efficiency is improved.

What is claimed is:

1. An intake system of a vehicle comprising:
    an air cleaner case, wherein the air cleaner case:
        includes an air inflow-side air cleaner case and an air outflow-side air cleaner case; and
        is made from a non-conductive synthetic resin material;
    an air filter, wherein:
        the air filter is removably arranged inside the air cleaner case; and
        a peripheral edge part of the air filter is held at a connecting part between the air inflow-side air cleaner case and the air outflow-side air cleaner case;
    a self discharge type static eliminator, wherein the self discharge type static eliminator:
        is a conductive layer disposed only on an outer wall surface of the connecting part of the air cleaner case; and
        has a corner part configured to discharge a positive charge when air moves into the corner part of the self discharge type static eliminator.

2. The intake system according to claim 1, wherein
    the air inflow-side air cleaner case and the air outflow-side air cleaner case are provided with connection flanges, respectively, in the connection part between the air inflow-side air cleaner case and the air outflow-side air cleaner case, the connection flanges projecting outwardly from an outer wall surface of the air inflow-side air cleaner case and an outer wall surface of the air outflow-side air cleaner case, respectively,
    the peripheral edge part of the air filter is held between the connection flange of the air inflow-side air cleaner case and the connection flange of the air outflow-side air cleaner case, and
    the self discharge type static eliminator is installed on at least one of an outer wall surface of the connection flange of the air inflow-side air cleaner case, and an outer wall surface of the connection flange of the air outflow-side air cleaner case.

3. The intake system according to claim 2, wherein
    the air filter includes filter paper and a filter paper support frame that supports a periphery of the filter paper, and
    the filter paper support frame is held between the connection flange of the air inflow-side air cleaner case and the connection flange of the air outflow-side air cleaner case.

4. The intake system according to claim 1, wherein the self discharge type static eliminator is metallic foil that is adhered onto a wall surface of the air cleaner case by a conductive adhesive.

5. The intake system according to claim 4, wherein the self discharge type static eliminator has a long and narrow rectangular flat plate shape.

6. The intake system according to claim 4, wherein the self discharge type static eliminator has a sharp end part.

7. The intake system according to claim 1, wherein the self discharge type static eliminator is formed integrally on a wall surface of the air cleaner case.

\* \* \* \* \*